United States Patent [19]

Skora

[11] Patent Number: 5,153,252
[45] Date of Patent: Oct. 6, 1992

[54] THERMOSETTING POWDER COATING COMPOSTIONS CONTAINING BISPHENOXY-PROPANOL AS A MELT VISCOSITY MODIFIER

[75] Inventor: Stanislaw B. Skora, Mountain Lakes, N.J.

[73] Assignee: Estron Chemical, Inc., Parsippany, N.J.

[21] Appl. No.: 800,091

[22] Filed: Nov. 29, 1991

[51] Int. Cl.⁵ .............................................. C08K 5/06
[52] U.S. Cl. .................... 524/372; 524/373; 524/904; 523/456
[58] Field of Search .............. 524/372, 373, 374, 904, 524/375; 523/456

[56] References Cited

U.S. PATENT DOCUMENTS

| | | | |
|---|---|---|---|
| 3,787,521 | 1/1974 | Labana | 524/904 |
| 3,810,867 | 5/1974 | Anderson | 524/374 |
| 3,907,744 | 9/1975 | Anderson | 524/373 |
| 3,931,117 | 1/1976 | Leonard | 528/45 |
| 4,065,438 | 12/1979 | Verborgt | 528/296 |
| 4,131,572 | 12/1978 | Brendley | 524/904 |
| 4,147,737 | 4/1979 | Sein et al. | 525/438 |
| 4,181,642 | 1/1980 | Hölle et al. | 523/451 |
| 4,286,021 | 8/1981 | Brendley | 428/413 |
| 4,442,270 | 4/1984 | Passmore et al. | 524/904 |
| 4,499,239 | 2/1985 | Murakami et al. | 525/111 |
| 4,742,121 | 5/1988 | Toman | 525/286 |

OTHER PUBLICATIONS

Skora, Acrylic flow control agents for the coating industry, Polymers Paint and Colour Journal, Sep. 5, 1979, p. 867.

Paintadosi et al., Hypocholesterolomic Activity of 1,2,Bis(substituted phenoxy)-1-propanones, Journal of Medicinal Chemistry, 1976, vol. 19, No. 2, pp. 222-220.

*Primary Examiner*—Paul R. Michl
*Assistant Examiner*—Tae H. Yoon
*Attorney, Agent, or Firm*—Mathews, Woodbridge & Collins

[57] ABSTRACT

The present invention relates to a thermosetting powder coating composition comprising a thermosetting polymer, a crosslinking agent, and a bisphenoxy-propanol as a melt viscosity modifier. Preferably, the composition additionally comprises a flow control agent different from the bisphenoxy-propanol.

16 Claims, No Drawings

THERMOSETTING POWDER COATING COMPOSTIONS CONTAINING BISPHENOXY-PROPANOL AS A MELT VISCOSITY MODIFIER

BACKGROUND OF THE INVENTION

1. Field of the Invention

The present invention relates to thermosetting powder coating compositions, useful as film-forming materials. More particularly, the present invention relates to thermosetting powder coating compositions containing bisphenoxy-propanol as the melt viscosity modifier.

2. Description of Related Art

Thermosetting compositions, including epoxy, acrylic and polyester resins, and various crosslinking agents, are known to be useful for coatings. The compositions should be in powder form, with an average particle size typically in the range of from 40 to 120 micrometers and should be physically and chemically stable during storage at ambient temperature for a prolonged period of time (usually up to 12 months). They are typically electrostatically applied to objects and heated to temperatures in the range from 120° to 240° C., at which point they fuse and undergo chemical reactions forming a durable, uniform, crosslinked, and insoluble film.

U.S. Pat. No. 4,065,438 describes thermosetting powder coating compositions comprising carboxyl functional polyesters and bisphenol A-type epoxy resins. These compositions have been found to result in coatings which exhibit excellent mechanical properties, such as flexibility and impact resistance.

U.S. Pat. No. 4,147,737 is directed to carboxyl functional polyester powder coatings crosslinked with triglycidyl isocyanurate. Such powder coating compositions have very good mechanical properties and relatively good outdoor durability. Alternatively, carboxlic polyester can be cured with hydroxyalkyl amides.

U.S. Pat. No. 3,931,117 discloses a process for the preparation of hydroxy functional polyester resins which, in combination with blocked isocyanates or melamine resins, are suitable for producing thermosetting powder coatings.

U.S. Pat. No. 4,181,642 describes glycidyl methacrylate copolymers as the basic polymers for the preparation of powder coating compositions. Such compositions can be used as ultraviolet light resistant coatings.

U.S. Pat. No. 4,286,021 discloses the use of low molecular weight acrylic copolymers based on isobornyl methacrylate as a melt viscosity modifier in powder coating systems.

Notwithstanding the disclosures in the above references, a continual need in the area of powder coating is to form a cured film with substantially no visible defects. Such defects are typically in the form of a poor flow, cratering, orange-peel effect and pin-holes. The flow can be improved and cratering and orange-peel effect eliminated by the use of flow control agents. However, the elimination of pin-holes requires special additives able to lower the melt viscosity of the powder coating composition during the curing process.

Acrylic additives described in U.S. Pat. No. 4,286,021 are capable of lowering the melt viscosity of the system, but do not eliminate or reduce the formation of pin-holes. Benzoin is also used as an additive in powder coating formulations, but it has a strong tendency to discoloration (yellowing) under the influence of heat.

SUMMARY OF THE INVENTION

The present invention is a thermosetting composition which is particularly useful as a powder coating material. The composition comprises a thermosetting polymer selected from the group including thermosetting polyester, thermosetting acrylic and epoxy resin. The compositions also comprise a crosslinking agent, also referred to as crosslinker or a curing agent, and a bisphenoxy-propanol compound present in a sufficient amount so as to prevent the formation of pin-holes during the process of curing the coating. The composition preferably comprises a flow control agent different from the bisphenoxy-propanol compound.

For the purpose of the present invention preventing the formation of pin-holes shall mean the substantial prevention and the total prevention of pinholes visible to the naked eye and visible with the help of magnifying instruments.

Preferred compositions comprise from about 65 to about 97, percent of a basic thermosetting polymer and a sufficient amount of crosslinking agent to form a powder coating film, with preferred amounts of crosslinking agent being from 3 to 35 percent by weight of the crosslinker. There is preferably from about 0.5 to about 3 percent of the bisphenoxy-propanol compound.

A preferred bisphenoxy-propanol compound has the formula:

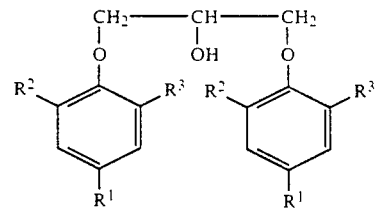

where $R^1$, $R^2$, and $R^3$ are the same or different radials selected from hydrogen, halogen, or aliphatic radicals having from 1 to 3 carbons. The most preferred bisphenoxy-propanol compound is 1,3-bisphenoxy-2-propanol.

The coating composition of the present invention results in high quality, smooth, substantially pin-hole free film coatings which are resistant to discoloration.

DESCRIPTION OF THE PREFERRED EMBODIMENTS

The present invention relates to a novel thermosetting powder coating composition comprising a thermosetting polymer, a crosslinking agent or curing agent, and bisphenoxy-propanol as a melt viscosity modifier. Preferably, the composition comprises a flow control agent different from the bisphenoxy-propanol.

The thermosetting polymer useful in the present invention includes an epoxy resin, thermosetting polyester polymers, or thermosetting acrylic resin. The thermosetting polymer has at least two functional groups of the same kind in a molecule. The functional group can be selected from epoxy, hydroxy, or carboxy groups.

Useful thermosetting epoxy, and polyester polymers are generally reviewed in Billmeyer, Jr., *A Textbook of Polymer Science*, Second Edition, Wiley-Interscience, Division of John Wiley & Sons, Inc., 1962. Reference is made to Chapter 16, Thermosetting Resins, beginning at page 468. Epoxy resins are also generally reviewed in May and Tanaka, ed., *Epoxy Resins Chemistry and Technology*, Marcel Dekker, Inc.

A preferred epoxy resin useful in the invention is prepared by the condensation of bisphenol A with epichlorohydrin in the presence of an alkaline compound such as sodium hydroxide. Its epoxy equivalent weight (EEW) preferably is from about 600 to about 900.

The polyester resin useful in the present invention can be hydroxy or carboxy functional. The hydroxy functional resin should have a hydroxyl number from about 30 to about 90, and the carboxy functional polyester should have an acid number from about 20 to about 100.

The polyester can be prepared by any manner known in the art, and is preferably made by condensing at least one polyfunctional organic acid, its methyl ester or anhydride thereto with at least one polyalcohol in the presence or absence of a catalyst. Useful catalysts include organo-tin compounds and organotitanium compounds.

Useful alcohols from which the polyester can be made to include alcohols having at least two hydroxy groups with preferred alcohols including ethylene glycol, propylene glycol, trimethylolethane, trimethylolpropane, and glycerin. Preferred alcohols include 1,4-butanediol, 1,6-hexanediol, and neopentyl glycol.

The carboxylic acids are preferably aromatic carboxylic acids, with the most preferred carboxylic acids being dicarboxyl acids and tricarboxyl acids. Examples of acid components include phthalic acid, terephthalic acid, isophthalic acid, trimellitic acid, pyromellitic acid, and the anhydrides thereof.

The polyester can optionally comprise minor amounts, i.e., less than 30 mole percent, of at least one other aliphatic of cycloaliphatic carboxylic acids. The presence of such comonomers is acceptable provided that the composition is useful in powder coating applications. Useful aliphatic and cycloaliphatic carboxylic acids include adipic acid, sebacic acid, succinic acid, tetrahydrophthalic acid, hexahydrophthalic acid, cyclohexanedicarboxylic acid, maleic acid, and fumaric acid.

The molar ratio of the acidic to alcoholic monomer in the polyester is selected in the manner resulting in a polyester having a softening point measured in accordance with ASTM E-28 of from 90° to 130° C.

The acrylic polymer useful in the invention can be prepared by free radical polymerization of acrylic and vinyl monomers with unsaturated monomers having hydroxy, carboxy, or epoxy groups. Useful acrylic resins include those having a hydroxy functionality with a hydroxy number of from about 30 to about 180; carboxy functionality having an acid number of about 20 to 110; and glycidol functionality having an epoxy equivalent weight from about 500 to 900. Useful acrylic polymers are disclosed in U.S. Pat. No. 4,181,642. The preferred softening point of acrylic polymers is from about 90° C. to 130° C., measured according to ASTM-E-28.

Useful functional monomers are selected from acrylic acid, methacrylic acid, crotonic acid, hydroxyethyl acrylate, hydroxyethyl methacrylate, hydroxypropyl acrylate, hydroxypropyl methacrylate, glycidyl acrylate, and glycidyl methacrylate.

Other acrylic monomers can be selected from the group consisting of the esters of an α,β-ethylenically unsaturated carboxylic acid having from 3 to 8 carbon atoms. A preferred acrylic monomer has the formula:

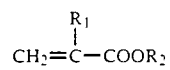

where $R_1$ is H or $CH_3$ and $R_2$ is an alkyl radical containing 1 to 8 carbon atoms. Useful acrylic monomers include: ethyl acrylate, butyl acrylate, isobutyl acrylate, 2-ethylhexyl acrylate, lauryl acrylate, methyl methacrylate, ethyl methacrylate, butyl methacrylate, isobutyl methacrylate, and lauryl methacrylate.

The acrylic polymer can optionally contain ethylenically monounsaturated vinyl comonomer which is different from the functional monomer and the acrylic monomer. Any such vinyl comonomer can be used which does not prevent the composition from being useful in powder coating applications. Examples of ethylenically unsaturated vinyl comonomers which can be useful are styrene, vinyl toluene, dimethyl styrene, alpha-methyl styrene, and vinyl acetate.

The copolymers can be prepared in any known manner, preferably by free-radical polymerization in bulk, solution, emulsion, or suspension. Preferably, the reaction is conducted in the presence of a free radical initiator such as benzoyl peroxide, tert-butyl peroxide, decanoyl peroxide, azo compounds such as azobisisobutyronitrile, and the like. Useful initiators are present in amounts ranging from 0.1 to about 5 percent by weight of the total monomers.

The acrylic polymers preferably have a number molecular weight as measured by gel permeation chromatography (GPC) in the range of from about 1500 to 10,000, and preferably 2000 to 8000.

An essential ingredient of a thermosetting powder coating composition is a crosslinking or curing agent. These compounds contain reactive groups capable of reacting at elevated temperatures with the functional groups of the basic polymer. Preferably, the crosslinking agent is selected from compounds having the following groups: alkoxy, blocked isocyanate, carboxy, epoxy and hydroxylamide groups.

The crosslinking agent can be selected from the following compounds: dicyandiamide, hydroxyalkylamides, hexamethoxy-melamine, tetramethoxymethylglycoluril, an aliphatic dicarboxylic acid, 1,-12-dodecanedionic acid, sebacic acid, 1,4-cyclohexanedicarboxylic acid, blocked isocyanates, such as caprolactam blocked isophorone diisocyanate and its oligomers, blocked toluenediisocyanate and its oligomers, triglycidyl isocyanurate, low molecular weight glycidyl methacrylate copolymers, and others.

Preferred crosslinking agents for thermosetting polyester polymers having carboxylic group functionality and thermosetting acrylic polymers having carboxylic group functionality include triglycidyl isocyanurate and hydroxylalkyl amides. Preferred crosslinking agents for thermosetting polyester polymers having hydroxyl functionality and thermosetting acrylic polymers having hydroxyl functionality include caprolactam blocked isophorone diisocyanate and tetramethoxymethylglycoluril. For thermosetting acrylic copolymers having glycidyl methacrylate functionality preferred crosslinking agents are 1,12-dodecanedionic acid and 1,4-cyclohexane dicarboxylic acid.

The bisphenoxy-propanol melt viscosity modifier of the present invention is a monomeric compound being in solid, crystalline form and able to form a uniform mixture with the other powder coating ingredients. The bisphenoxy-propanol compound is present in minor amounts, preferably in the range of from about 0.5 to about 3.0 percent by weight.

During the curing (baking) of powder coating at elevated temperatures, the melt viscosity modifier acts as a solvent, lowering the melt viscosity of the composition and allowing the release of entrapped gases and volatiles from the film and preventing the formation of pin-holes. An advantage of using the melt viscosity modifier is its durability against oxidation and discoloration during the baking process and during aging of the formed coating.

The melt viscosity modifier useful in the present invention has the following formula:

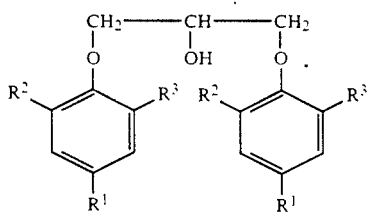

where $R^1$, $R^2$, and $R^3$ can be the same or different radicals selected from hydrogen, halogen, alkyl, or alkoxy radicals. The most useful compound is 1,3 bisphenoxy-2-propanol obtained from phenol and epichlorohydrin.

A procedure for the preparation of 1,3-bis (substituted phenoxy)-2-propanols is provided in the *Journal of Medicinal Chemistry*, 1976, Volume 19, No. 2, pages 222-229.

The composition of the present invention can additionally contain flow control agents different than the melt viscosity modifier bisphenoxy-propanol compound of the present invention. Flow control agents are used to produce a smooth, uniform coating. They are added to eliminate surface imperfections, such as poor flow, orange peel effect and cratering. However, as shown in the Examples below, they do not prevent the formation of defects such as pin-holes. Useful flow control agents include silicone oligomers, fluorinated polyolefins, polyvinyl butyral, polyacrylates and others. Generally flow control agents function by lowering the surface tension of the coating system. The melt viscosity modifier of the present invention in contrast lowers the melt viscosity of the powder coating composition during the initial step of the baking process.

Optionally, pigments, colorants, plasticizers, stabilizers, catalysts, antistatic agents, and other conventional additives can be included in the composition.

Powder coating compositions can be prepared by dry blending all ingredients, followed by melt blending in an internal mixer, or in an extruder at room temperatures ranging from 80°-120° C. The homogeneous composition is then cooled to room temperature, comminuting by crushing or grinding in a mill and screened. Useful product is a free-flowing powder having a particle size of less than about 120 micrometers and preferably from 40 to 120 micrometers. The powder composition of the present invention is physically and chemically stable at room temperature for prolonged periods of time up to 2 years. The compositions can be applied as a dry coating on a substrate, such as on a metallic object, and then baked within an oven at 160°-220° C. from 5-30 minutes to obtain a crosslinked film having excellent mechanical strength, thermal stability, solvent resistance, adhesion, mechanical strength, and durability against weathering.

The following Examples illustrate the practice of the present invention. The Example should not be construed as limiting the invention to anything less than that which is disclosed or which would have been obvious to one of ordinary skill in the art therefrom. Percents and part are by weight unless otherwise indicated.

COMPARATIVE EXAMPLE 1

Ninety parts of the carboxyl functional polyester resin Uralac P2400 sold by DMS Resins, 10 parts of triglycidyl-isocyanurate made by Ciba-Geigy, 1 part of a polyacrylate flow control, agent Resiflow P-67 sold by Estron Chemical and 500 parts of titanium dioxide were dry-blended in a high speed mixer than homogenized by an extruder at 105° C. The hot extruded material was cooled to room temperature, pulverized in a micromill, and passed through a 140-mesh screen. The free-flowing powder was applied electrostatically onto a mild steel plate, and baked at 180° C. for 20 minutes. A glossy, uniform film was obtained which however by closer inspection had visible tiny holes (pin-holes).

EXAMPLE 2

A powder coating composition was prepared in the same way as in Example 1, except that in the initial step, 2 parts of 1,3-bisphenoxy-2-propanol as the melt viscosity modifier were added. The baked coating was glossy, uniform and was totally free of pin-holes.

COMPARATIVE EXAMPLE 3

Fifty six part of the carboxy functional polyester resin Uralac P-830 sold by DSM Resins, 3.1 parts of a hydroxyalkylamide crosslinker Primid XL-552 sold by Rohm & Haas Co., 0.9 parts of Resiflow P-67 and 40.4 parts of titanium dioxide were dry-blended, then homogenized in a preheated to 110° C. extruder. The extrudate was cooled to room temperature, crushed, ground and passed through a 140-mesh screen. The resulting powder was then applied electrostatically onto the mild steel panel and baked at 180° C. for 20 minutes. A glossy, uniform coating was obtained, which however had a large amount of pin-holes.

EXAMPLE 4

Example 3 was repeated except that the powder coating composition contained additionally 1.5 parts of 1,3-bisphenoxy-2-propanol. The resulting coating was glossy and uniform and was free of pin-holes.

EXAMPLE 5

Sixty-six parts of the glycidyl group containing acrylic resin Isocryl EP-550 (Estron Chemical), 13.7 parts of 1,12 didecanedioic acid (DuPont), 1 part of Resiflow P-67, 1 part of 1,3-bisphenoxy-2-propanol and 18.3 parts titanium dioxide were dry-blended then extruded at 104° C. The extrudate was cooled, crushed, ground and sieved on a 140 mesh screen. The powder composition was then applied electrostatically onto a mild steel panel and baked at 200° C. for 20 minutes. The resulting coating was gloss, uniform and free of pin-holes.

EXAMPLE 6

Fifty-four parts of the hydroxy functional polyester resin Rucote 102 (Ruco Polymer Corp.), 10.4 parts of blocked isophorone diisocyanate Rucote Curative NI-2 (Ruco Polymer Corp.), 0.6 parts of Resiflow P-67 (Estron Chemical), 1.0 parts Oxymelt A-1 (Estron Chemical), 0.5 parts Octaflow ST-70 (Estron Chemical), and 33 parts titanium dioxide were dry-blended, then homogenized in an extruder which had been pre-heated to a temperature of 110° C. The extruded material was then allowed to cool to room temperature. It was then ground and passed through a 140-mesh screen. The fine powder was electrostatically applied onto a mild steel plate, and baked for 20 minutes at 180° C. The result was a glossy and uniform film which was completely free of pin-holes.

While exemplary embodiments of the invention have been described, the true scope of the invention is to be determined from the following claims.

What is claimed is:

1. In a thermosetting powder composition containing a thermosetting polymer and a cross-linking agent therefor, the improvement which comprises the presence of an amount of a 1,3-bis(phenoxy)propan-2-ol at least sufficient to lower the melt viscosity of said composition and reduce pin-hole formation.

2. A thermosetting powder composition according to claim 1 wherein the 1,3-bis(phenoxy)propan-2-ol has the formula:

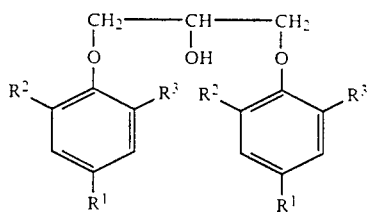

in which each of $R^1$, $R^2$, and $R^3$ independently of the other is hydrogen, halogeno, or an aliphatic radicals of up to 3 carbons.

3. A thermosetting powder composition according to claim 2 wherein each of $R^1$, $R^2$, and $R^3$ is hydrogen.

4. A thermosetting powder composition according to claim 1 wherein the amount of the 1,3bis(phenoxy)propan-2-ol is from about one-half to about three weight percent of the thermosetting polymer and cross-linking agent.

5. A thermosetting powder composition comprising
   (i) at least about 65 weight percent of a thermosetting resin having a softening point of from about 90° to about 130° C.;
   (ii) an effective amount to about 35% of a cross-linking agent for such thermosetting resin; and
   (iii) from about 0.5 to about 3 weight percent, based on the amount of thermosetting resin and cross-linking agent, of a 1,3bis(phenoxy)propan-2-ol.

6. A thermosetting powder composition according to claim 5 wherein the thermosetting polymer is a carboxy functional polyester resin having a carboxyl number from about 20 to about 100.

7. A thermosetting powder composition according to claim 5 wherein the thermosetting polymer is hydroxy functional polyester resin having a hydroxyl number from about 30 to about 90.

8. A thermosetting powder composition according to claim 5 wherein the thermosetting polymer is a carboxy functional acrylic resin having an acid number from about 20 to about 110.

9. A thermosetting powder composition according to claim 5 wherein the thermosetting polymer is a hydroxy functional acrylic resin having a hydroxy number from about 30 to about 180.

10. A thermosetting powder composition according to claim 5 wherein the thermosetting polymer is a glycidyl functional acrylic resin has a number average molecular weight from about 200 to about 1000.

11. A thermosetting powder composition according to claim 5 wherein the cross-linking agent is a triglycidyl isocyanurate.

12. A thermosetting powder composition according to claim 5 wherein the cross-linking agent is a hydroxyalkylamide.

13. A thermosetting powder composition according to claim 5 wherein the cross-linking agent is an aliphatic dicarboxylic acid.

14. A thermosetting powder composition according to claim 5 wherein the cross-linking agent is caprolactam blocked isocyanate.

15. A thermosetting powder composition according to claim 5 wherein the cross-linking agent is tetramethoxymethyl glycoluril.

16. In the method of coating a substrate by applying a thermosetting powder coating composition comprising a thermosetting polymer and a cross-linking agent therefor to the substrate and then heating t he substrate and coating composition, the improvement which comprises adding to the coating composition an amount of a 1,3-bis(phenoxy)propan-2-ol at least sufficient to lower the melt viscosity of the coating composition and reduce pin-hole formation during heating.

* * * * *